United States Patent
Lucas et al.

(10) Patent No.: US 10,551,227 B2
(45) Date of Patent: Feb. 4, 2020

(54) SUPERVISED PROPORTIONAL METERING DEVICE AND METHODS FOR MONITORING A METERING PUMP

(71) Applicant: DOSATRON INTERNATIONAL, Tresses (FR)

(72) Inventors: Gregory Lucas, Saint-Loubes (FR); Christophe Charriere, Camblanes et Meynac (FR)

(73) Assignee: DOSATRON INTERNATIONAL, Tresses (FR)

( * ) Notice: Subject to any disclaimer, the term of this patent is extended or adjusted under 35 U.S.C. 154(b) by 91 days.

(21) Appl. No.: 15/750,234

(22) PCT Filed: Jul. 13, 2016

(86) PCT No.: PCT/IB2016/054171
§ 371 (c)(1),
(2) Date: Feb. 5, 2018

(87) PCT Pub. No.: WO2017/021801
PCT Pub. Date: Feb. 9, 2017

(65) Prior Publication Data
US 2018/0231407 A1    Aug. 16, 2018

(30) Foreign Application Priority Data
Aug. 6, 2015 (FR) ...................... 15 57578

(51) Int. Cl.
*F04B 9/10* (2006.01)
*G01F 1/36* (2006.01)
(Continued)

(52) U.S. Cl.
CPC ............... *G01F 1/36* (2013.01); *F04B 9/10* (2013.01); *F04B 13/02* (2013.01); *F04B 43/067* (2013.01);
(Continued)

(58) Field of Classification Search
None
See application file for complete search history.

(56) References Cited

U.S. PATENT DOCUMENTS 4,628,881 A * 12/1986 Beck .................. F02D 41/3836
123/446
7,975,597 B2   7/2011 Darbois et al.
(Continued)

FOREIGN PATENT DOCUMENTS

EP    1 971 774 A1   9/2008
EP    1 971 776 A1   9/2008
(Continued)

OTHER PUBLICATIONS

International Search Report, dated Oct. 12, 2016, from corresponding PCT/IB2016/054171 application.

*Primary Examiner* — Harshad R Patel
(74) *Attorney, Agent, or Firm* — Young & Thompson (57) ABSTRACT

Disclosed is a monitored proportional metering device including a liquid metering pump having an inlet, an outlet, a suction nozzle, and a mechanism for adjusting the flow in the nozzle. The metering device is also includes a detection assembly, the assembly including at least a unit for detecting the pressure variation in the nozzle, which unit is arranged between the first suction valve and the mixing chamber, a water meter at the inlet, a probe for measuring the level in the container of material to be suctioned, a unit for determining the position of the mechanism for adjusting the volume to be suctioned, and a man/machine interface for processing, recording, and displaying the data from the detection unit. Also disclosed are methods for monitoring a metering pump implementing the proportional metering device.

17 Claims, 3 Drawing Sheets

(51) Int. Cl.
*F04B 13/02* (2006.01)
*F04B 43/067* (2006.01)
(52) U.S. Cl.
CPC ....... *F04B 2205/02* (2013.01); *F04B 2207/70* (2013.01)

(56) References Cited

U.S. PATENT DOCUMENTS

| | | | |
|---|---|---|---|
| 10,049,553 B2 * | 8/2018 | Lucas | ............... G01L 19/16 |
| 2010/0154625 A1 | 6/2010 | Darbois et al. | |
| 2013/0202456 A1 | 8/2013 | Lucas et al. | |

FOREIGN PATENT DOCUMENTS

| | | |
|---|---|---|
| EP | 2 359 932 A1 | 8/2011 |
| FR | 2 965 864 A1 | 4/2012 |
| GB | 2 303 885 A | 3/1997 |
| WO | 2012/046162 A1 | 4/2012 |

* cited by examiner

SUPERVISED PROPORTIONAL METERING DEVICE AND METHODS FOR MONITORING A METERING PUMP

BACKGROUND OF THE INVENTION

The invention relates to a monitored proportional metering device comprising a pump of the type comprising a hydraulic motor and a set of means of detecting the operation of said pump. The invention also relates to a set of methods employing such a metering device for monitoring the metering pump.

It is known practice to check the operation of this type of pump. By way of example, document FR2965864 A1 describes a metering pump of the type comprising an intake nozzle equipped with a first intake valve communicating with a working chamber in which a piston can be moved in a reciprocating movement, intake being produced, with opening of the intake valve, when the piston is moving away from the nozzle, and delivery being produced, with closure of the first intake valve and expulsion of liquid through an outlet valve, when the piston is moving closer to the nozzle. This pump more particularly comprises, between the first intake valve and the working chamber, a device able to detect the variations in pressure in the nozzle, this device comprising on the one hand a duct connected to one end of the working chamber and equipped at its other end with the intake valve and, on the other hand, means sensitive to the pressure in the duct, mounted in the wall of the duct. From variations in pressure recorded by the device it is possible, through computerized processing of the data, to determine various operating parameters, such as to calculate the metering in real time, the time of use of the metering pump, the consumption of chemical product, and also the number of breakdowns.

BRIEF SUMMARY OF THE INVENTION

However, it has been found that the detection of the variations in pressure is not always reliable when the flow rates with which the intake nozzle is supplied are low. Added to this difficulty is also the fact that the device able to detect the variations in pressure as developed in document FR2965864 A1 displays weaknesses when the metering uses medicinal solutions laden with powders the dilution of which is somewhat random. Finally, this device focuses entirely on the reliability of the intake by the metering pump, completely disregarding any problems associated with malfunctioning of the hydraulic motor.

This is why the object of the invention is to alleviate all or some of the disadvantages listed hereinabove by proposing a device and a set of methods making it possible more fully to monitor the operation of metering pumps, particularly in low-flow rate applications.

More particularly, one subject of the invention is a monitored proportional metering device comprising a liquid metering pump provided with an inlet, with an outlet, with an intake nozzle equipped with a first intake valve and communicating, at one of its ends, with a mixing chamber internal to the pump and, at the other of its ends, with a container of product to be drawn in, and with a hydraulic motor comprising a member capable of effecting a reciprocating movement, the supply of liquid to the pump inlet triggering the reciprocating movement of the member, which movement alternately causing intake through the nozzle as far as the mixing chamber with opening of the first intake valve when the member is moving away from the nozzle followed by expulsion at the pump outlet with closure of the first intake valve when the member is moving closer to the nozzle, the metering device also comprising a mechanism for adjusting the flow rate in the nozzle, characterized in that the metering device further comprises a set of detection means, said set including at least:
- means for detecting the variation in pressure in the nozzle, which means are arranged between the first intake valve and the mixing chamber,
- a probe for measuring the level in the container of product to be drawn in,
- means for determining the position of the intake-volume adjustment mechanism,
- a man/machine interface for processing, recording and displaying the data derived from the detection means.

Additional or replacement optional features of the invention are listed hereinafter.

The monitored proportional metering device may comprise an inlet water meter.

The means for detecting the variation in pressure in the nozzle may comprise at least a first volume in fluidic communication with the inside of the nozzle, a closed second volume contiguous with the first while at the same time being separated therefrom by a flexible membrane, a sensor of the pressure in the second volume so that the variations in supply of fluid to the first volume give rise to deformations of the membrane and, as a consequence, to variations in pressure in the closed second volume.

The pressure sensor may be a sensor of piezoelectric or capacitive type.

A second intake valve may be arranged at the inlet of the working chamber.

The man/machine interface may comprise an outlet able to be connected to an alarm mechanism.

The set of detection means may comprise a means of counting the cycles of the hydraulic motor.

Another subject of the invention is a first method for monitoring a metering pump employing a proportional metering device according to the invention, said device comprising a means of counting the cycles of the hydraulic motor and an inlet water meter, characterized in that it comprises:
- a step during which the position of the intake volume adjustment mechanism is measured,
- a later step during which, with the pump running, the volume of water admitted at the inlet of the pump, and the variation in volume of product in the container are determined over a duration T0,
- a later step in which the theoretical value of product drawn in over the duration T0 is calculated from the measured position of the adjusting mechanism and from the volume of water admitted at the inlet of the pump,
- a later step in which the theoretical value of product drawn in over the duration T0 is compared with the variation in volume of product in the container.

Additional or replacement optional features of the invention are listed hereinafter.

According to certain features, the volume of water admitted at the inlet of the pump over a duration T0 is determined by measurement using the water meter.

According to other features, the volume of water admitted at the inlet of the pump over a duration T0 is determined by an estimation made by the means of counting the cycles of the hydraulic motor.

According to yet other features, the variation in volume of product in the container over a duration T0 is determined by measurement using the probe for measuring the level in the container.

According to yet other features, the variation in volume of product in the container over a duration T0 is determined by estimation using the means for detecting the variation in pressure in the nozzle.

Another subject of the invention is a second method for monitoring a metering pump employing a proportional metering device according to the invention, said device comprising a means of counting the cycles of the hydraulic motor and an inlet water meter, characterized in that it comprises:
- a step during which, with the pump running, the volume of water admitted at the inlet of the pump over a duration T0 is measured using the water meter,
- a step during which the volume of water admitted at the inlet of the pump over the duration T0 is estimated from the number of cycles counted for the hydraulic motor,
- a later step in which the estimated value of the volume of water admitted at the inlet of the pump over the duration T0 is compared with the measured value.

Another subject of the invention is a third method for monitoring a metering pump employing a proportional metering device according to the invention, said device comprising a means of counting the cycles of the hydraulic motor, characterized in that it comprises:
- a step during which the number of cycles of the hydraulic motor with the pump running is counted,
- a step during which the number of intake cycles is determined using the means of detecting variations in pressure in the nozzle,
- a later step in which the number of cycles of the hydraulic motor is compared with the number of intake cycles.

Another subject of the invention is a fourth method for monitoring a metering pump employing a proportional metering device according to the invention, said device comprising a means of counting the cycles of the hydraulic motor, characterized in that it comprises:
- a step during which the position of the intake volume adjustment mechanism is measured,
- a step during which, with the pump running, the variation in volume of product in the container is estimated over a duration T0 and using the means of detecting variations in pressure in the nozzle.

Additional or replacement optional features of the invention are listed hereinafter. According to certain features, the method comprises:
- a step during which, with the pump running, the variation in volume of product in the container is measured with the probe over a duration T0,
- a later step in which the estimated value of product drawn in over the duration T0 is compared with the variation in volume of product in the container.

In general, the invention applies to a broad range of inlet water flow rates, it being possible for these flow rates to be comprised between 5 l/h and 30 m³/h, the flow rate in the nozzle being comprised between 0.02 l/h and 600 l/h.

Advantageously, the aforementioned monitoring methods may make provision for an alarm to be triggered in the event of nonconformity in the comparison steps.

Further advantages and features of the invention will become apparent from reading the detailed description of some nonlimiting exemplary embodiments and implementations and from studying the following attached drawings:

DETAILED DESCRIPTION OF THE INVENTION

Because the embodiments described hereinafter are entirely nonlimiting, it is notably possible to consider alternative forms of the invention comprising only a selection of the features described, in isolation from the other features described (even if this selection is isolated within a sentence containing these other features), if this selection of features is enough to confer a technical advantage or to differentiate the invention from the prior art. This selection comprises at least one feature, preferably functional without structural details, or with just some of the structural details if this amount of structural detail alone is enough to confer a technical advantage or to differentiate the invention from the prior art.

For the sake of conciseness and clarity, the elements bear the same references in all the various figures.

Figure 1:
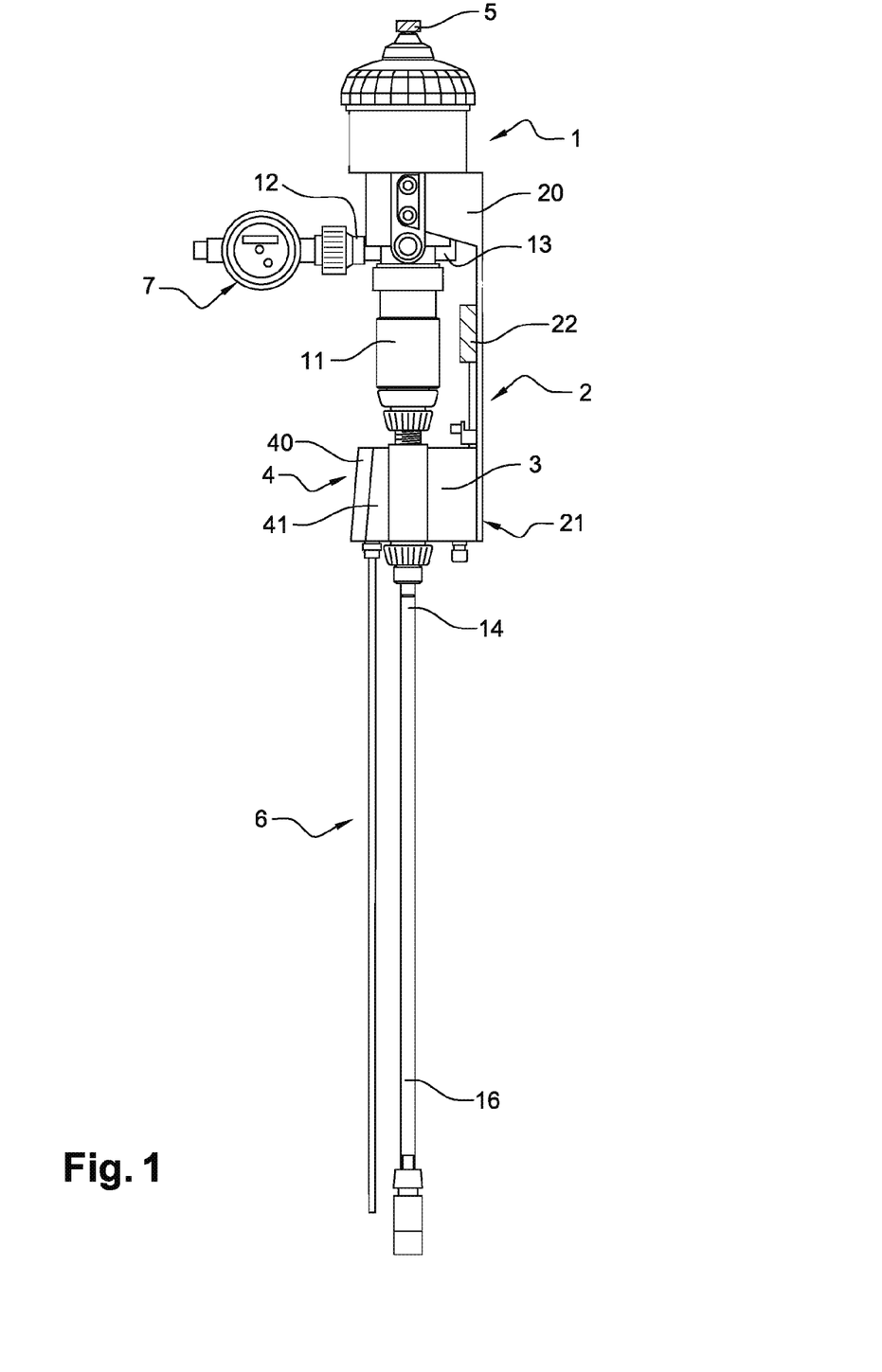
FIG. 1 is a schematic depiction of a monitored proportional metering device according to one embodiment of the invention.

FIG. 1 depicts one embodiment of a monitored proportional metering device. The latter comprises a liquid metering pump 1 provided with an inlet 12, with an outlet 13 and with an intake nozzle 16. This intake nozzle is equipped with a first intake valve 14 communicating, at one of its ends, with a mixing chamber internal to the pump (not depicted in the figure) and, at the other of its ends, with a container of product to be drawn up (which is not depicted in the figure).

The metering pump 1 is of the type comprising a hydraulic motor provided with a member capable of effecting a reciprocating movement, the supply of liquid to the pump inlet triggering the reciprocating movement of the member, which movement alternately causes intake through the nozzle as far as the mixing chamber with opening of the first intake valve 14 when the member is moving away from the nozzle 16 then expulsion at the pump outlet 13 with closure of the first intake valve when the member is moving closer to the nozzle.

The hydraulic motor may be of the type described in document EP1971776 A1.

This hydraulic motor comprises a casing comprising a body and a cover, a separation means able to effect a reciprocating movement in the casing between the body and the cover, this separation means defining two chambers. The hydraulic motor also comprises hydraulic switching means for supplying liquid to and removing liquid from the aforementioned chambers. These switching means comprise a distribution member able to adopt two stable positions and controlled by the movements of the separation means. The body of the casing also encloses a compartment connected to an inlet of pressurized fluid and in which the switching means are housed, as well as triggering means comprising a plunger connected to the separation means, which are able, at the end of the stroke, to bring about a sudden change in the position of the switching means, under the action of an elastic means, to reverse the stroke. The distribution member comprises a distribution slide pressed against a flat plate that is fixed relative to the body of the casing, the distribution slide being able to slide in a sealed manner, without a seal, against the plate which comprises orifices respectively connected to the chambers of the casing and to a liquid outlet orifice. The slide is therefore designed to, depending on its position, close some of the orifices or place them in communication with the fluid inlet or with the exhaust.

The hydraulic motor may also be of the type described in document EP1971774 A1.

In that case, the hydraulic motor comprises a casing, a piston able to slide in a reciprocating movement in the casing, the piston separating the casing into two chambers, hydraulic switching means for supplying liquid to and removing liquid from the chambers separated by the piston. These switching means are controlled by the movements of the piston and comprise at least one connecting rod acting on a distribution member able to adopt two stable positions. Also provided are triggering means comprising a plunger capable, at the end of the piston stroke, to bring about a sudden change in the position of the switching means, under the action of an elastic means, to reverse the stroke. The elastic means is secured, at each of its ends, to an articulation member housed respectively in a housing provided on the connecting rod and on another moving part of the hydraulic motor, each housing being open in a direction that is substantially the opposite to the direction of the force applied by the elastic means in the housing, so that each articulation member can be extracted from its open housing against the action of said force.

Figure 3:
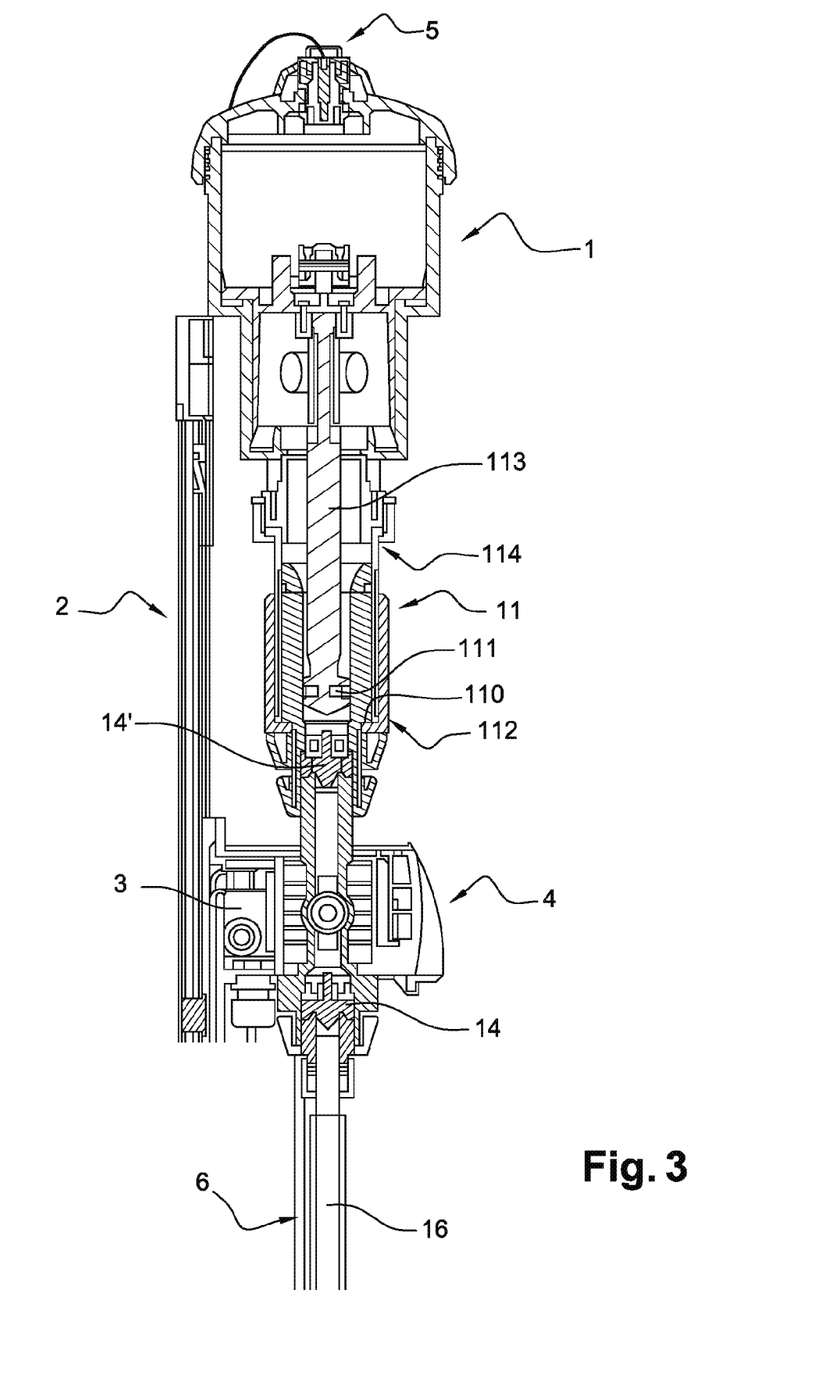
FIG. 3 is a depiction of another detail of such a metering device.

The metering device also comprising a mechanism for adjusting the volume drawn into the nozzle 16. This mechanism is described in FIG. 3 and involves an adjusting nut 112 which drives the body 110 of the metering pump into its liner 114. 20 Because at the top neutral point of the hydraulic motor, the metering plunger 113 and seal 111 leave the body 110 of the metering pump, the metering stroke is therefore longer or shorter. As a result, the volume drawn in is greater or lesser. Because the volume of water for a cycle is near-constant, there is a greater or lesser degree of metering.

The metering device further comprises a set of detection means, said set comprising at least the elements listed hereinafter, namely:
  means 3 are provided for detecting the variation in pressure in the nozzle 16, which means are arranged between the first intake valve 14 and the mixing chamber,
  a probe 6 for measuring the level in the container of product to be drawn in, means 22 for determining the position of the intake-volume adjustment mechanism 11,
  a man/machine interface 4 for processing, recording and displaying the data derived from the detection means.

Regarding the means for detecting the variations in pressure in the nozzle, use may be made of a membrane installed on a portion of the nozzle wall, and of means of detecting the movements of the membrane as a result of the variations in pressure.

The means for detecting the movements of the membrane may be of the type of those described in application WO20012/046162. They may therefore comprise an optical sensor observing the movements of a feeler actuated by a finger connected to the membrane. The means for detecting the movements of the membrane may also comprise a displacement sensor of inductive type, particularly a Hall-effect sensor.

Advantageously, the means of detecting the movements of the membrane employ materials that are insensitive to potential chemical attack from the solutions used.

Figure 2:
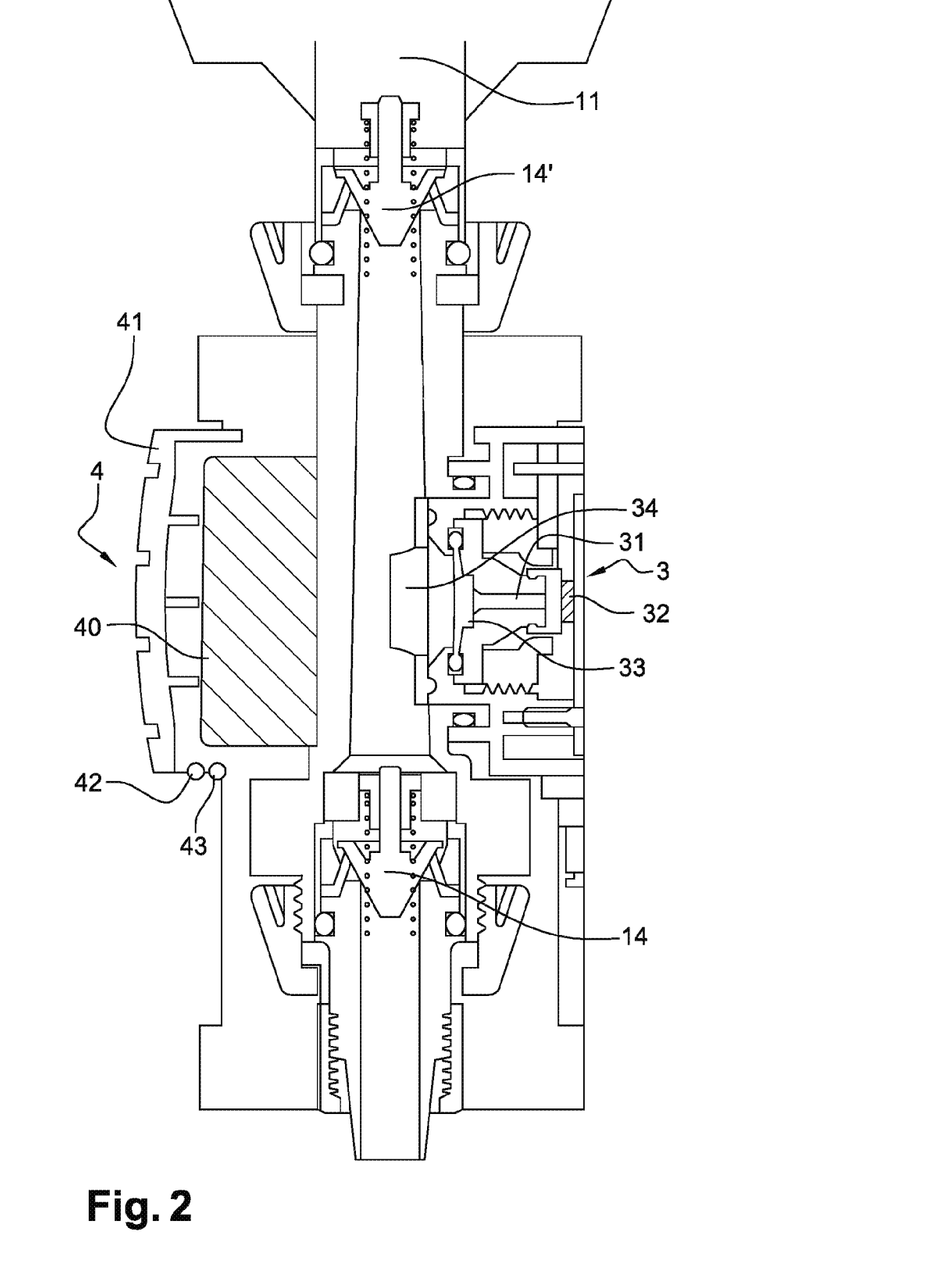
FIG. 2 is a depiction of a detail of such a metering device.

Advantageously, the means for detecting the variations in pressure may preferably comprise, as depicted in FIG. 2, at least a first volume 34 in fluidic communication with the inside of the nozzle, a closed second volume 31 contiguous with the first while at the same time being separated therefrom by a flexible membrane 33, and a sensor 32 of the pressure in the second volume. In this way, when there are variations in the supply of liquid to the first volume 34, namely when the liquid is being pumped from the container to the working chamber of the pump 1, deformations of the membrane occur. As a result, the volume of the closed second volume 31 varies and, as a result, the gas trapped in this closed volume experiences a variation in pressure. It is these variations in pressure that the sensor 32 records. This configuration offers the particular advantage of detecting very small variations in pressure, something which cannot always be achieved with the devices known from the prior art.

Advantageously, a second intake valve 14' is arranged at the inlet of the working chamber. In this way, the variation in liquid in the nozzle is indeed associated with the cycle and dependent on the near-synchronous opening and closing of the valves 14 and 14'. In other words, the variation in pressure in the nozzle 16 is not disturbed by reflux or other phenomena originating from the working chamber.

The pressure sensor may be a sensor of piezoelectric or alternatively capacitive type.

Advantageously, a water meter 7 may be arranged at the inlet 12 of the metering pump. The monitoring of the device can be extended in this way.

Regarding the water meter 7 at the inlet 12, other, equally commonplace, means could be used as a replacement for this.

The probe 6 able to measure the level in the container in which the liquid that is to be drawn in is stored may consist of a tube, separate from the nozzle, one end of which is designed to dip into the container and the other end of which is kept fixed relative to the intake nozzle, so that it is situated outside the container. This other end is closed and equipped with a pressure sensor sensing the air pressure in the tube, which sensor provides an electrical signal at output.

The means for determining the position of the mechanism 11 for adjusting the volume that is to be drawn in, may consist of a position sensor 22 mounted on the moving part 21 of a chassis 2 secured to the body of the pump at its fixed part 20.

The man/machine interface 4 comprises a screen 41 equipped with keys allowing the data derived from the detection means to be processed, recorded and displayed. The processing, recording and display operations are performed by a processor 40.

Advantageously, a USB output 43 may be provided so as to allow data transfer, memory storage, and software updates. Likewise, the man/machine interface comprises an output 42 which can be connected to an alarm mechanism.

Optionally, the set of detection means may comprise a means 5 of counting the cycles of the hydraulic motor. This means may adopt the form of a switch of the reed switch type, the latter making it possible to count the number of reciprocating movements of the separation means in document EP1971776 A1, or alternatively of the piston in document EP1971774 A1.

The proportional metering device as described hereinabove can be employed in such a way as to monitor various operating points of the metering pump 1.

Depending on the steps employed, it is possible to check whether the actual metering is indeed that initially required when setting the mechanism 11 for adjusting the volume to be drawn in. It is also possible to check that there has been no malfunctioning of the hydraulic motor, of the intake performed by the metering pump, or indeed to verify that the additive container is not simply empty.

Use of a proportional metering device according to the invention, said device comprising a means of counting the cycles of the hydraulic motor, may allow the metering to be checked as follows.

In a first step, the position of the intake volume adjustment mechanism is measured in order to define what metering has been chosen. This measurement is performed using the means 22 for determining the position of the intake volume adjustment mechanism 11.

In a later step during which, the pump is running, the volume of water admitted at the inlet of the pump, and the variation in volume of product in the container are determined over a duration T0.

According to an alternative form, the volume of water admitted at the inlet of the pump over a duration T0 is determined by direct measurement using the water meter 7.

Alternatively, the volume of water admitted at the inlet of the pump over a duration T0 is determined by estimation using the means 5 of counting the cycles of the hydraulic motor.

The variation in volume of product in the container can itself be estimated using the means 3 for detecting the variation in pressure in the nozzle.

Alternatively, the variation in volume of product in the container can be measured directly using the probe 6 for measuring the level in the container.

Next, the theoretical value of product drawn in over the duration T0 is calculated from the measured position of the adjusting mechanism and from the volume of water admitted to the inlet of the pump.

Finally, the theoretical value of product drawn in over the duration T0 is compared with the variation in volume of product in the container, the two values being required to be identical.

Use of a proportional metering device according to the invention, said device comprising a means of counting the cycles of the hydraulic motor, may thus allow monitoring of the operation of the hydraulic motor of the metering pump.

In a step during which, with the pump running, the volume of water admitted to the inlet of the pump over a duration T0 is measured using the water meter 7.

Next, the volume of water admitted to the inlet of the pump over the duration T0 is estimated from the number of cycles counted for the hydraulic motor over the duration T from the means 5 of counting the cycles of the hydraulic motor.

Finally, the estimated value of the volume of water admitted to the inlet of the pump over the duration T0 is compared with the measured value, the two values being required to be identical.

This type of monitoring makes it possible to reveal defective operation of the hydraulic motor (leaks, breakage of parts, etc.).

Use of a proportional metering device according to the invention, said device further comprising a means 5 of counting the cycles of the hydraulic motor, may also make it possible to monitor the operation of the metering pump.

First of all, the number of cycles of the hydraulic motor with the pump running is counted.

Then the number of intake cycles is determined using the means 3 of detecting the variations in pressure in the nozzle.

Finally, the number of cycles of the hydraulic motor is compared with the number of intake cycles, the two values being required to be identical.

Use of a proportional metering device according to the invention may also make it possible to monitor the operation of the metering pump, and to do so without having to resort to a means 5 of counting the cycles.

This monitoring method comprises:
- a step during which the position of the intake volume adjustment mechanism is measured using the means 22,
- a step during which, with the pump running, the variation in volume of product in the container is estimated over a duration T0 and using the means 3 of detecting variations in pressure in the nozzle,
- a step during which, with the pump running, the variation in volume of product in the container is measured with the probe 6 over a duration T0,
- a later step in which the estimated value of product drawn in over the duration T0 is compared with the variation in volume of product in the container, these two values being required to be identical.

Advantageously, the methods may comprise a step of alerting in the event of nonconformity in the results of the comparison. This is rendered possible by the man/machine interface which comprises an output 42 able to be connected to an alarm mechanism.

By way of comparison, the Applicant Company has compared the device of the invention against a device comprising a vane-type flow meter and against a device comprising a flow switch. The focus was on determining whether the means of detecting the variations in pressure in the nozzle were operational for low flow rates in the nozzle. The test range therefore chosen was the range of nozzle flow rates comprised between 0.1 l/h to 250 l/h

|  | Invention | Vane-type flow meter | Flow Switch |
| --- | --- | --- | --- |
| Range of operation on proportional metering pump | Covers the range of nozzle flow rates comprised between 0.1 l/h and 250 l/h | Does not cover the range of nozzle flow rates comprised between 0.1 l/h and 250 l/h | Does not cover the range of nozzle flow rates comprised between 0.1 l/h and 250 l/h |
| Sensitivity to powders | NO | YES | NO |
| Volume estimated or measured | Estimated | Measured | Estimated |
| Chemical resistance | YES | YES | YES |

As explained in the above table, monitoring of the metering pump may come into operation in instances in which the water flow rate at the inlet 12 of the metering pump is comprised between 5 l/h and 30 m$^3$/h.

By considering a very low dosage at 0.2% for an inlet flow rate to 5 l/h it is possible to monitor the operation of the device for a low nozzle flow rate of 0.02 l/h.

By considering a metering at 1% for an inlet flow rate of 30 m$^3$, it is possible to monitor the operation of the device for a high nozzle flow rate of 600 l/h.

This particularly broad range was not hitherto covered by any other device, flow meters of the vane type or alternatively of the flow switch type operating in far narrower ranges.

Likewise, unlike certain flow rate measurement devices that are sensitive to particles (risks of abrasion) the device of the invention, thanks to the membrane, is able to tolerate the passage of powders in aqueous solution without becoming damaged.

Of course, the invention is not restricted to the examples that have just been described and numerous modifications may be made to these examples without departing from the scope of the invention. In addition, the various features, forms, alternative forms and embodiments of the invention may be combined with one another in various combinations provided that they are not incompatible with one another or mutually exclusive.

The invention claimed is:

1. A proportional metering device comprising:
   a liquid metering pump, said liquid metering pump comprising:
      an inlet,
      an outlet,
      an intake nozzle, said intake nozzle comprising a first intake valve and communicating, at one of its ends, with a mixing chamber internal to the pump and, at the other of its ends, with a container of product to be drawn in, and
      a hydraulic motor comprising a member that effects a reciprocating movement,
   wherein said liquid metering pump comprises a water meter at the inlet thereof, and
   wherein a supply of liquid to the pump inlet trigger the reciprocating movement of the member, the reciprocating movement alternately causing intake through the nozzle as far as the mixing chamber with opening of the first intake valve when the member is moving away from the nozzle followed by expulsion at the pump outlet with closure of the first intake valve when the member is moving closer to the nozzle,
   said metering device further comprising:
      a mechanism for adjusting the flow rate in the nozzle, and
      a set of detection means, said set including at least:
         means for detecting a variation in pressure in the nozzle, said means being arranged between the first intake valve and the mixing chamber,
         a probe for measuring a level in the container of product to be drawn in,
         means for determining a position of the intake-volume adjustment mechanism, and
         a man/machine interface for processing, recording and displaying the data derived from the detection means.

2. The proportional metering device as claimed in claim 1, wherein the means for detecting the variation in pressure in the nozzle comprises:
   at least a first volume in fluidic communication with the inside of the nozzle,
   a closed second volume contiguous with the first while at the same time being separated therefrom by a flexible membrane, and
   a sensor of the pressure in the second volume so that the variations in supply of fluid to the first volume give rise to deformations of the membrane and, as a consequence, to variations in pressure in the closed second volume.

3. The proportional metering device as claimed in claim 2, wherein a second intake valve is arranged at the inlet of the mixing chamber.

4. The proportional metering device as claimed in claim 2, wherein the man/machine interface comprises an output connected to an alarm mechanism.

5. The proportional metering device as claimed in claim 1, wherein the man/machine interface comprises an output connected to an alarm mechanism.

6. The proportional metering device as claimed in claim 1, wherein the set of detection means comprises a means of counting cycles of the hydraulic motor.

7. A method for monitoring a metering pump employing a proportional metering device as claimed in claim 1, said device comprising a means of counting cycles of the hydraulic motor and an inlet water meter at the inlet of the metering pump, said method comprising:
   a step during which the position of the intake volume adjustment mechanism is measured,
   a later step during which, with the pump running, the volume of water admitted at the inlet of the pump, and the variation in volume of product in the container are determined over a duration T0,
   a later step in which the theoretical value of product drawn in over the duration T0 is calculated from the measured position of the adjusting mechanism and from the volume of water admitted at the inlet of the pump,
   a later step in which the theoretical value of product drawn in over the duration T0 is compared with the variation in volume of product in the container.

8. The method of monitoring a metering pump as claimed in claim 7, wherein the volume of water admitted at the inlet of the pump over a duration T0 is determined by measurement using the water meter.

9. The method of monitoring a metering pump as claimed in claim 7, wherein the volume of water admitted at the inlet of the pump over a duration T0 is determined by an estimation made by the means of counting the cycles of the hydraulic motor.

10. The method of monitoring a metering pump as claimed in claim 7, wherein the variation in volume of product in the container over a duration T0 is determined by measurement using the probe for measuring the level in the container.

11. The method of monitoring a metering pump as claimed in claim 7, wherein the variation in volume of product in the container over a duration T0 is determined by estimation using the means for detecting the variation in pressure in the nozzle.

12. The method of monitoring a metering pump as claimed in claim 7, wherein the flow rate of water at the inlet of the metering pump is comprised between 5 l/h and 30 m$^3$/h, the flow rate in the nozzle being comprised between 0.02 l/h and 600 l/h.

13. The method of monitoring a metering pump as claimed in claim 7, wherein an alarm is triggered in the event of nonconformity in the comparison steps.

14. A method for monitoring a metering pump employing a proportional metering device as claimed in claim 1, said device comprising a means of counting cycles of the hydraulic motor and an inlet water meter at the inlet of the metering pump, said method comprising:
   a step during which, with the pump running, the volume of water admitted at the inlet of the pump over a duration T0 is measured using the water meter,
   a step during which the volume of water admitted at the inlet of the pump over the duration T0 is estimated from the number of cycles counted for the hydraulic motor,
   a later step in which the estimated value of the volume of water admitted at the inlet of the pump over the duration T0 is compared with the measured value.

15. A method for monitoring a metering pump employing a proportional metering device as claimed in claim 1, said device comprising a means of counting cycles of the hydraulic motor, said method comprising:
- a step during which the number of cycles of the hydraulic motor with the pump running is counted,
- a step during which the number of intake cycles is determined using the means of detecting variations in pressure in the nozzle,
- a later step in which the number of cycles of the hydraulic motor is compared with the number of intake cycles.

16. A method of monitoring a metering pump employing a proportional metering device as claimed in claim 1, said method comprising:
- a step during which the position of the intake volume adjustment mechanism is measured,
- a step during which, with the pump running, the variation in volume of product in the container is estimated over a duration T0 and using the means of detecting variations in pressure in the nozzle.

17. The method of monitoring a metering pump as claimed in claim 16, further comprising:
- a step during which, with the pump running, the variation in volume of product in the container is measured with the probe over a duration T0,
- a later step in which the estimated value of product drawn in over the duration T0 is compared with the variation in volume of product in the container.

* * * * *